(12) United States Patent
Gustafson et al.

(10) Patent No.: US 10,064,019 B2
(45) Date of Patent: Aug. 28, 2018

(54) SINGLE FREQUENCY NETWORK USING ETHERNET MULTICAST

(71) Applicant: NOKIA TECHNOLOGIES OY, Espoo (FI)

(72) Inventors: Kenneth Gustafson, Schaumburg, IL (US); Roy Yang, Buffalo Grove, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 95 days.

(21) Appl. No.: 15/196,909

(22) Filed: Jun. 29, 2016

(65) Prior Publication Data

US 2018/0007520 A1    Jan. 4, 2018

(51) Int. Cl.
*H04W 4/08* (2009.01)
*H04W 74/08* (2009.01)
(Continued)

(52) U.S. Cl.
CPC ............. *H04W 4/08* (2013.01); *H04L 1/1861* (2013.01); *H04L 67/02* (2013.01);
(Continued)

(58) Field of Classification Search
CPC . H04W 4/08; H04W 74/0833; H04W 72/042; H04W 72/0413; H04L 1/1861; H04L 67/02
See application file for complete search history.

(56) References Cited

U.S. PATENT DOCUMENTS

2008/0175238 A1* 7/2008 Venkatachalam ..... H04L 12/189
370/390
2008/0311902 A1* 12/2008 Diepstraten ......... H04W 72/005
455/426.1
(Continued)

OTHER PUBLICATIONS

IEEE Instrumentation and Measurement Society, IEEE Standard for a Precision Clock Synchronization Protocol for Networked Measurement and Control Systems, IEEE Std 1588-2008, Jul. 24, 2008.
(Continued)

*Primary Examiner* — Ajay Cattungal
(74) *Attorney, Agent, or Firm* — Squire Patton Boggs (US) LLP (57) ABSTRACT

Various communication systems may benefit from an improved signaling protocol. For example, communication systems may benefit from an improved network support for a single frequency network transmission using an Ethernet switch. A method includes receiving a message at an access point in a single frequency network from a network entity through a data switch. The message comprises an indication of at least one of a downlink physical channel or an uplink physical channel. The method also includes transmitting a request for a signal characteristic through the at least one downlink physical channel to a user equipment. In addition, the method includes receiving the signal characteristic through the at least one uplink physical channel from the user equipment. Further, the method includes transmitting a response message through the data switch from the access point to the network entity indicating the signal characteristic.

23 Claims, 9 Drawing Sheets

(51) Int. Cl.
*H04W 72/04* (2009.01)
*H04L 1/18* (2006.01)
*H04L 29/08* (2006.01)

(52) U.S. Cl.
CPC ..... *H04W 72/042* (2013.01); *H04W 72/0413* (2013.01); *H04W 74/0833* (2013.01)

(56) References Cited

U.S. PATENT DOCUMENTS

| | | | | |
|---|---|---|---|---|
| 2010/0085867 | A1* | 4/2010 | Ji | H04W 72/005 370/216 |
| 2011/0069772 | A1* | 3/2011 | Vrzic | H04L 1/0003 375/261 |
| 2011/0141963 | A1* | 6/2011 | Lim | H04H 20/67 370/312 |
| 2012/0076063 | A1* | 3/2012 | Jiang | H04L 5/0007 370/312 |
| 2012/0163270 | A1* | 6/2012 | Chun | H04B 7/022 370/312 |
| 2012/0224541 | A1 | 9/2012 | Yoshiuchi et al. | |
| 2013/0121230 | A1* | 5/2013 | Kim | H04W 56/0045 370/312 |
| 2013/0343346 | A1* | 12/2013 | Chen | H04W 72/082 370/332 |
| 2015/0049661 | A1* | 2/2015 | Draznin | H04W 4/00 370/312 |
| 2015/0078179 | A1* | 3/2015 | Lui | H04W 4/06 370/252 |

OTHER PUBLICATIONS

Samsung R3-160679, Function Split Between Central and Remote Node; 3GPP TSG-RAN WG3 Meeting #91bis; Bangalore, India, Apr. 11-15, 2016, 3 pages.

Partial International Search Report corresponding to PCT/EP2017/066093 dated Sep. 1, 2017.

* cited by examiner

SINGLE FREQUENCY NETWORK USING ETHERNET MULTICAST

BACKGROUND

Field

Various communication systems may benefit from an improved signaling protocol. For example, communication systems may benefit from an improved network support for a single frequency network transmission using an Ethernet switch.

Description of the Related Art

Providing high quality cellular radio coverage may present various challenges. Those challenges may be exacerbated in areas that hold a large number of users, such as large buildings, event venues, or other comparable facilities. One way to provide high quality cellular radio coverage in such facilities is to distribute lower-power radio head (RH) units. Installations in areas with relatively low user densities can combine multiple RHs into a single cell to provide a maximum quality signal with a minimum amount of maintenance and configuration. Areas of higher user densities, on the other hand, may use multiple cells constructed throughout a given coverage area.

Figure 1:
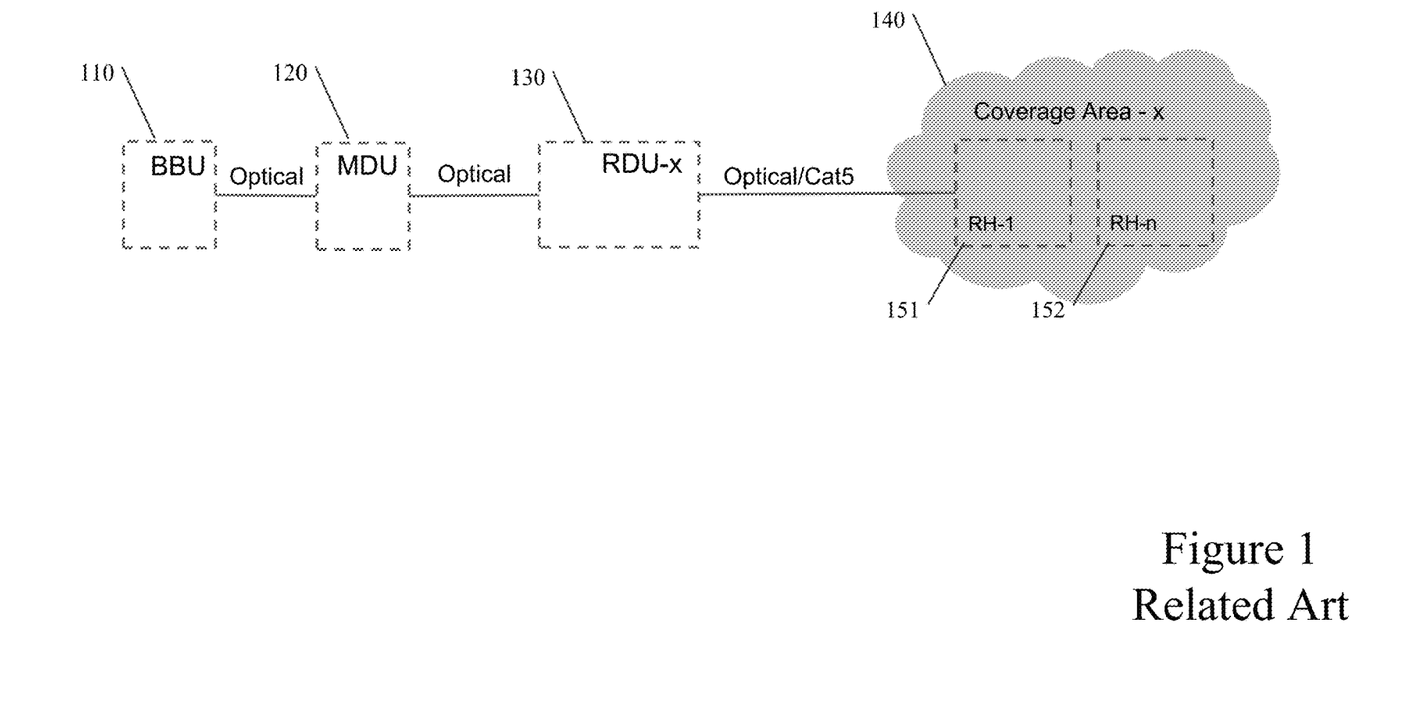
FIG. 1 illustrates an example of distributed antenna systems.

A distributed antenna system (DAS) may be used to provide cellular coverage in indoor venues. FIG. 1 illustrates an example of a DAS. As shown in FIG. 1, DAS may include a baseband unit (BBU) 110, a main distribution unit (MDU) 120, and a remote distribution unit (RDU) 130 connected to one another. A common public radio interface (CPRI) or an open base station architecture initiative (OBSAI) may serve as an interface between BBU, MDU, and RDU components. The MDU may support multiple RDU that can be configured either for a single or multiple coverage areas.

As illustrated in FIG. 1, RDU 130 is configured to connect multiple RHs 151, 152 in a single coverage area 140 to BBU 110 and MDU 120. The BBU, which is responsible for signal processing, can be put in a single, centralized location. The RHs, on the other hand, are responsible for receiving the processed signal from the BBU, and propagating the signal to a user equipment. The RHs may be placed in different locations in an indoor venue, depending on the demands of the network. High rate baseband signals may be transported between components, such as BBU 110, MDU 120, and/or RDU 130, using a combination of optical and copper links.

The RDU can also be configured to allow the RHs to be configured in one or more coverage areas. CPRI and OBSAI support the distribution of a single downlink (DL) radio signal to multiple RH, forming a single frequency network (SFN). In other words, the RDU may transmit information to multiple RHs on the same frequency channel. In embodiments in which an RH supports multiple independent antenna ports, CPRI and/or OBSAI may support the distribution of different signals to each antenna port. Support for DL multiple input multiple output (MIMO) within a coverage area requires a minimum of two unique signals to be transmitted on the antenna ports.

CPRI and/or OBSAI also allow for combining of uplink (UL) radio signals from multiple RHs. In cases where an RH supports multiple independent antenna ports, the UL signals from each port can be independently combined to support UL MIMO operation. Due to its reliance on CPRI and OBSAI technology, DAS may include various scaling, installation, and maintenance inefficiencies.

SUMMARY

A method, in certain embodiments, may include receiving a message at an access point in a single frequency network from a network entity through a data switch. The message can include an indication of at least one of a downlink physical channel or an uplink physical channel. The method may also include transmitting a request for a signal characteristic through the downlink physical channel to a user equipment. In addition, the method may include receiving the signal characteristic through the uplink physical channel from the user equipment. Further, the method includes transmitting a response message through the data switch from the access point to the network entity indicating the signal characteristic.

According to certain embodiments, an apparatus may include at least one memory including computer program code, and at least one processor. The at least one memory and the computer program code may be configured, with the at least one processor, to cause the apparatus at least to receive a message at an access point in a single frequency network from a network entity through a data switch. The message can include an indication of at least one of a downlink physical channel or an uplink physical channel. The at least one memory and the computer program code may also be configured, with the at least one processor, at least to transmit a request for a signal characteristic through the downlink physical channel to a user equipment. In addition, the at least one memory and the computer program code may also be configured, with the at least one processor, at least to receive the signal characteristic through the uplink physical channel from the user equipment. Further, the at least one memory and the computer program code may also be configured, with the at least one processor, at least to transmit a response message through the data switch from the access point to the network entity indicating the signal characteristic.

An apparatus, in certain embodiments, may include means for receiving a message at an access point in a single frequency network from a network entity through a data switch. The message may include an indication of at least one of a downlink physical channel or an uplink physical channel. The apparatus may also include means for transmitting a request for a signal characteristic through the downlink physical channel to a user equipment. In addition, the apparatus may include means for receiving the signal characteristic through the uplink physical channel from the user equipment. Further, the apparatus may include means for transmitting a response message through the data switch from the access point to the network entity indicating the signal characteristic.

According to certain embodiments, a non-transitory computer-readable medium encoding instructions that, when executed in hardware, perform a process. The process may include receiving a message at an access point in a single frequency network from a network entity through a data switch. The message can include an indication of at least one of a downlink physical channel or an uplink physical channel. The process may also include transmitting a request for a signal characteristic through the downlink physical channel to a user equipment. In addition, the process may include receiving the signal characteristic through the uplink physical channel from the user equipment. Further, the process may include transmitting a response message through the data switch from the access point to the network entity indicating the signal characteristic.

According to certain embodiments, a computer program product encoding instructions for performing a process according to a method including receiving a message at an access point in a single frequency network from a network entity through a data switch. The message can include an indication of at least one of a downlink physical channel or an uplink physical channel. The method may also include transmitting a request for a signal characteristic through the downlink physical channel to a user equipment. In addition, the method includes receiving the signal characteristic through the uplink physical channel from the user equipment. Further, the method includes transmitting a response message through the data switch from the access point to the network entity indicating the signal characteristic.

A method, in certain embodiments, may include transmitting a message from a network entity to an access point in a single frequency network through a data switch. The message may include an indication of at least one of a downlink physical channel or an uplink physical channel. The method can also include receiving a response message from the access point through the data switch indicating a signal characteristic. In addition, the method can include selecting a user equipment to be served by the at least one access point based on the signal characteristic.

According to certain embodiments, an apparatus may include at least one memory including computer program code, and at least one processor. The at least one memory and the computer program code may be configured, with the at least one processor, to cause the apparatus at least to transmit a message from a network entity to an access point in a single frequency network through a data switch. The message can include an indication of at least one of a downlink physical channel or an uplink physical channel. The at least one memory and the computer program code may also be configured, with the at least one processor, to cause the apparatus at least to receive a response message from the access point through the data switch indicating a signal characteristic. In addition, the at least one memory and the computer program code may be configured, with the at least one processor, to cause the apparatus at least to select a user equipment to be served by the at least one access point based on the signal characteristic.

An apparatus, in certain embodiments, may include means for transmitting a message from a network entity to an access point in a single frequency network through a data switch. The message may include an indication of at least one of a downlink physical channel or an uplink physical channel. The apparatus may also include means for receiving a response message from the access point through the data switch indicating a signal characteristic. In addition, the apparatus may include means for selecting a user equipment to be served by the at least one access point based on the signal characteristic.

According to certain embodiments, a non-transitory computer-readable medium encoding instructions that, when executed in hardware, perform a process. The process may include transmitting a message from a network entity to an access point in a single frequency network through a data switch. The message may include an indication of at least one of a downlink physical channel or an uplink physical channel. The process may also include receiving a response message from the access point through the data switch indicating a signal characteristic. In addition, the process may include selecting a user equipment to be served by the at least one access point based on the signal characteristic.

According to certain embodiments, a computer program product encoding instructions for performing a process according to a method including transmitting a message from a network entity to an access point in a single frequency network through a data switch. The message may include an indication of at least one of a downlink physical channel or an uplink physical channel. The method may also include receiving a response message from the access point through the data switch indicating a signal characteristic. In addition, the method may include selecting a user equipment to be served by the at least one access point based on the signal characteristic.

A method, in certain embodiments, may include receiving at an access point an advertisement comprising area information for at least one single frequency network. The method can also include determining a uniform resource locator based on the advertisement and a preconfigured area identification stored in the access point. In addition, the method can include dynamically selecting a multicast group to join using the uniform resource locator.

According to certain embodiments, an apparatus may include at least one memory including computer program code, and at least one processor. The at least one memory and the computer program code may be configured, with the at least one processor, to cause the apparatus at least to receive at an access point an advertisement comprising area information for at least one single frequency network. The at least one memory and the computer program code may also be configured, with the at least one processor, to cause the apparatus at least to determine a uniform resource locator based on the advertisement and a preconfigured area identification stored in the access point. In addition, the at least one memory and the computer program code may be configured, with the at least one processor, to cause the apparatus at least to dynamically select a multicast group to join using the uniform resource locator.

An apparatus, in certain embodiments, may include means for receiving at an access point an advertisement comprising area information for at least one single frequency network. The apparatus may also include means for determining a uniform resource locator based on the advertisement and a preconfigured area identification stored in the access point. In addition, the apparatus may include means for dynamically selecting a multicast group to join using the uniform resource locator.

According to certain embodiments, a non-transitory computer-readable medium encoding instructions that, when executed in hardware, perform a process. The process may include receiving at an access point an advertisement comprising area information for at least one single frequency network. The process may also include determining a uniform resource locator based on the advertisement and a preconfigured area identification stored in the access point. In addition, the process may include dynamically selecting a multicast group to join using the uniform resource locator.

According to certain embodiments, a computer program product encoding instructions for performing a process according to a method including receiving at an access point an advertisement comprising area information for at least one single frequency network. The method may also include determining a uniform resource locator based on the advertisement and a preconfigured area identification stored in the access point. In addition, the method may include dynamically selecting a multicast group to join using the uniform resource locator.

BRIEF DESCRIPTION OF THE DRAWINGS

For proper understanding of the invention, reference should be made to the accompanying drawings, wherein.

DETAILED DESCRIPTION

Due to reliance on CPRI and/or OBSAI technology, DAS may have a variety of inefficiencies. For example, DAS may have an inefficient capacity scaling. BBU processing requirements may vary greatly between low and high density installations. For example, high powered BBU designs may be too expensive for low density situations, while low powered BBU designs may require replication, and can be too expensive for high density situations. In addition, optical link capacity may be easily exhausted by high density installations, and MDU or RDU equipment may need to be upgraded to support higher rates. As such, additional optical links may need to be installed.

DAS may also have high installation and maintenance costs. For example, dedicated optical cables may need to be installed, and IT staff may not be familiar with CPRI or OBSAI configuration on DAS. Further, DAS may not be able to share existing network equipment. DAS may also use a large amount of on-site equipment, including BBU, MDU, and multiple RDU.

Certain embodiments of the invention can leverage network equipment used for commodity networking, and share the equipment with other services to provide a lower cost alternative to DAS. Such embodiments may be capable of initially supporting an SFN configuration, while also supporting higher capacity radio schemes.

In particular, certain embodiments may provide support for SFN transmission across a set of access point (AP) units, in which network functions are distributed to the AP units with use of a data switch, for example, an Ethernet switch. Such embodiments may be incorporated into Third Generation Partnership Project (3GPP) technology, such as Long Term Evolution (LTE), LTE-Advanced (LTE-A), 3rd generation technology (3G), for example, Wideband Code Division Multiple Access (WCDMA), 4th generation technology (4G), and 5th generation technology (5G).

SFN must include a broadcast network in which signals sent from several transmitters are synchronized. Synchronization may be aided by a local synchronization source, such as a global positions system (GPS), and/or by a network synchronization source, such as a master clock.

In certain embodiments, for example, physical (PHY) layer functions may be located in an access point associated with the SFN, while data link layer functions, such as media access control (MAC) and/or radio link control (RLC), may reside on at least one other network entity. The network entity in which the physical layer function resides, and the at least one network entity in which the data link layer functions reside, may communicate with one another using a data switch, such as an Ethernet switch. In other embodiments, the access point may include both PHY layer functions and data link functions.

Figure 2:
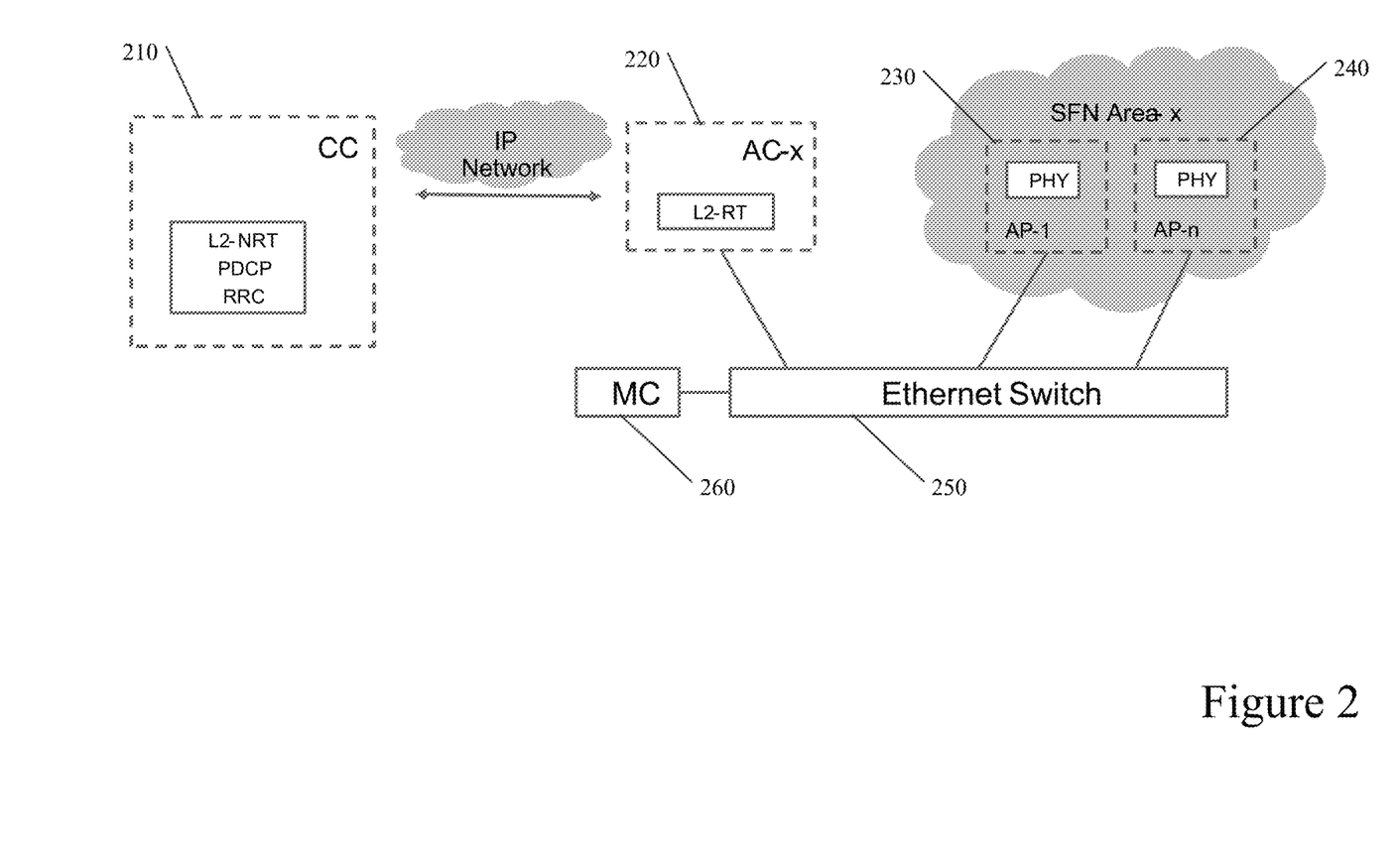
FIG. 2 illustrates a system according to certain embodiments.

FIG. 2 illustrates a system according to certain embodiments. The system can include several distinct network entities or elements that together support SFN transmission across a set of AP units. In certain embodiments a common control (CC) 210 and an area control (AC) 220 may be provided. CC 210 and AC 220 may communicate through the Internet Protocol (IP) network. In other embodiments, CC 210 and AC 220 may communicate through any interface, using a wireless or wired connection. In some embodiments, the CC 210 and AC 220 may replace BBU 110, MDU 120, and RDU 130 illustrated in FIG. 1. Alternatively, functions of the CC 210 and AC 220 may reside within any of the network elements shown in FIG. 1. While AC 220 may contain the data link function associated with the SFN, AC 220 can distribute the data to a data link function located at the AP. In certain embodiments, the AP may be a non-SFN cell. The SFN cell, for example CC 210 or AC 220, and a non-SFN cell, for example an AP unit, may serve a single user equipment simultaneously.

Although CC 210 and AC 220 are shown as two separate network elements in FIG. 2, in some embodiments the functions of CC 210 and AC 220 can be combined or collocated into a single network element. In other embodiments, CC 210 and AC 220 can be deployed as separate network elements, for example in a cloud approach, or may be combined to create a standalone solution.

AC 220 may be an independent network element connected to one or more physical ports of a data switch 250, such as an Ethernet switch. In other embodiments, AC 220 may distribute data to a data link function located at the AP, which may be located inside a remote radio unit (RRU), through a local link. The data switch may be a general purpose data switch or a data switch used for multicast broadcasting.

CC 210 and AC 220 may share data link or layer 2 functions. In other words, CC 210 may help AC 220 perform data link layer functions. For example, AC 220 may be in charge of layer 2 functions that can operate at a transmission time interval (TTI) rate of the LTE physical layer. CC 210, on the other hand, may be in charge of all functions associated with radio resource control (RRC), packet data convergence protocol (PDCP), and/or any other layer 2 function that does not rely on TTI.

The embodiments illustrated in FIG. 2 can also include AP units ranging from AP-1 230 to AP-n 240, where n represents the total number of AP units. While some embodiments may include one AP unit, other embodiments include a plurality of AP units. In certain embodiments, AP-1 to AP-n may replace RHs 151, 152 shown in FIG. 1. AC 220 may transmit a message to APs 230, 240. The message may include an indication of at least one DL physical channel and/or at least one UL physical channel APs may use the DL physical channel to communicate with a user equipment (UE), while the UL physical channels may be used to receive information from the UE.

In certain embodiments, AP-1 230 to AP-n 240 may be located in the same SFN area, such as area x. SFN can use a single carrier frequency and cell identity to cover a large geographical area. In other embodiments, AP-1 to AP-n may be located in a plurality of SFN areas, with each area having a plurality of AP units. The number of AP units per SFN may be determined by the number of units needed to maintain the minimum quality of service (QoS) required by the network. In some embodiments, there may be as little as one AP unit per SFN area, while other SFN areas may have a plurality of AP units.

AP units 230, 240, may in certain embodiments perform physical layer functions. Therefore, in certain embodiments, while AP units 230, 240 are in charge of physical layer functions, other network entities, such as AC 220 or CC 210, may be in charge of higher layer functionality, such as data link or layer 2 functionality. In such embodiments, physical layer and data link layer functions may be shared by at least two separate network entities or elements. While in some embodiments the same network entity may include both physical layer and higher layer functioning, there may be an additional network entity that will perform higher layer functioning, without performing any physical layer functions, for example CC.

When both the AC and the AP are located within the same entity, the communications between the physical layer functions and the data link functions may be based on the internal Flexi interface used in Flexi System Module (FSM). FSM may use serial rapid inputs/outputs (SRIO) to transfer messages from a centralized location to remote APs. In other embodiments, the communication between the physical layer functions and the data link functions may be based on open interfaces, such as Femto Application Platform Interface (FAPI). In some embodiments, a data switch, such as an Ethernet switch, may be used to facilitate communication between the AP units and the network entities performing at least some higher layer functions.

In certain embodiments, the replication of the DL signal replication and combination of the UL signal may be used to combine the APs 230 of a given coverage area, such as SFN area-x, into a single logical cell. The single local cell may be an Ethernet switch 250. The DL signals from multiple APs can be combined throughout the coverage area to form a SFN.

The system of FIG. 2 also includes a data switch, for example, an Ethernet Switch 250. Ethernet switch 250 may be used to communicate data between AC 220 and AP units 230, 240 in the SFN area. In other embodiments, the data switch may be any other kind of data switch capable of facilitating a connection between the AP units 230, 240 and the AC 220.

In certain embodiments, data sent from the AP may be synchronized using a local synchronization source or a network synchronization source. To do so, a master clock (MC) 260 may be included along with the data switch, such as an Ethernet switch. The MC may support an IEEE 1588 Precision Time Protocol, and may support time synchronization for the network elements shown in FIG. 2. IEEE 1588 Precision Time Protocol is hereby incorporated by reference in its entirety. MC may operate either as a grandmaster clock, when local Global Navigation Satellite System (GNSS) is possible, or as a boundary clock receiving timing from a remote grandmaster. The MC may provide common timing for all elements connected to the data switch. In some embodiments, MC 260, Ethernet Switch 250, and AC 220 may be combined into a single entity.

Figure 3:
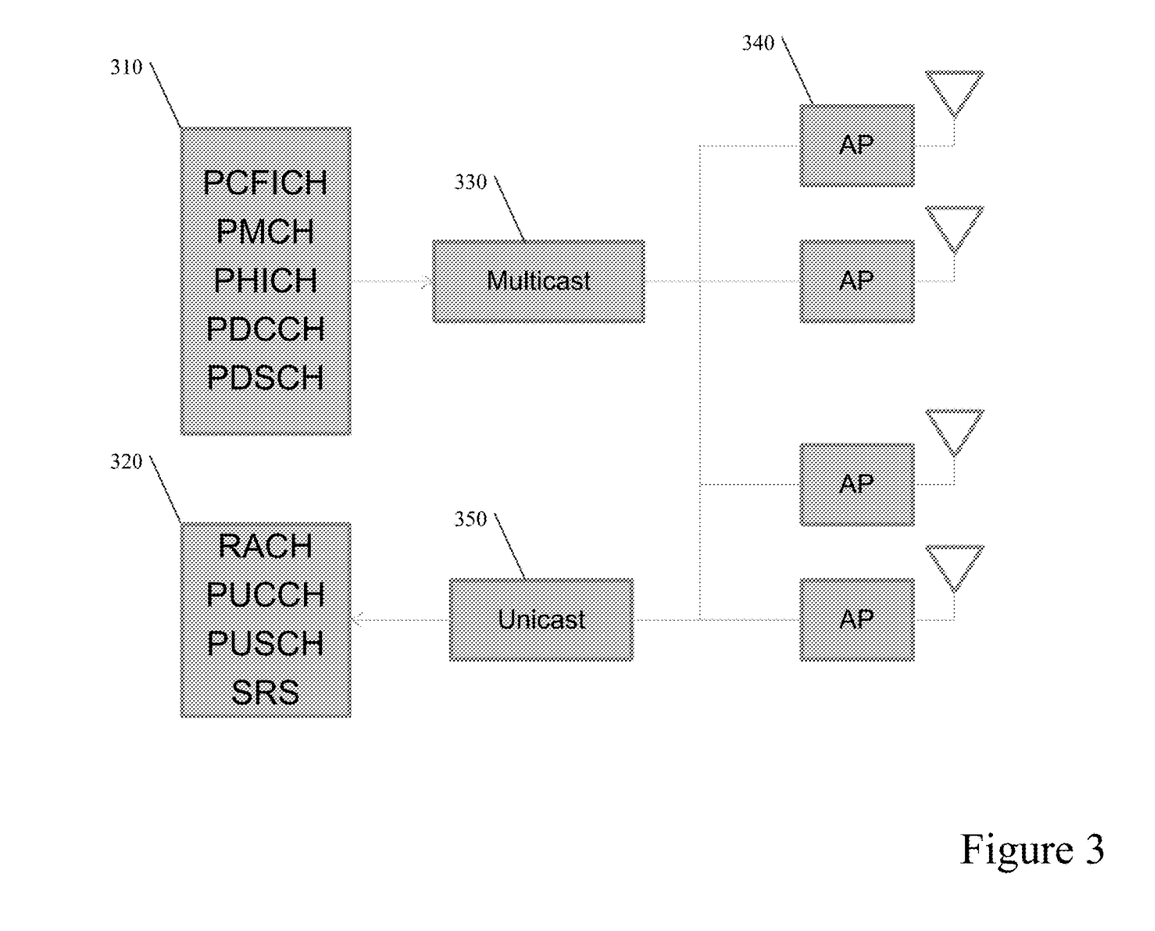
FIG. 3 illustrates a system according to certain embodiments.

FIG. 3 illustrates a system according to certain embodiments. In particular, FIG. 3 illustrates a distribution between physical layer functioning, in the APs 230, 240 shown in FIG. 2, and the higher layer functioning in the CC 210/AC 220 shown in FIG. 2, that utilize a combination of Ethernet multicast and unicast to implement replication of DL physical channels and to select UL physical channels. FIG. 3 illustrates downlink messages 310 sent or produced by an AC, and uplink messages 320 received or consumed by an AC, having various high layer functions, such as layer 2 functions. Some of the functions operate at a transmission time interval (TTI) rate of the LTE physical layer.

In certain embodiments, the AC may utilize multicast replication of downlink physical channels. For example, the AC may transmit a message, such as a physical application programming interface (API) message that includes an indication of at least one DL physical channel to at least one AP. The at least one DL physical channel may be, for example, a physical control format indicator channel (PCFICH), a physical multicast channel (PMCH), a physical hybrid automatic repeat request indicator channel (PHICH), a physical downlink control channel (PDCCH), and/or a physical downlink shared channel (PDSCH). In certain embodiments, downlink messages 310 may be transmitted in multicast packets from the AC to at least one AP 340. The message can also be transmitted through a data switch, such as an Ethernet switch shown in FIG. 2, which is capable of multicast broadcasting.

The multicast packets 330 may include an indicator, for example, a header or a label. The indicator can act as an identifier such that the multicast packet or a portion of the packet can be processed by the at least one AP, having one or more physical layer functions.

Upon receiving multicast packets 330, APs 340 may encode and/or transmit the associated physical channels to associated UEs. In addition to receiving an indication of the at least one DL physical channel, APs 340 may also receive an indication of at least one UL physical channel APs 340 may decode the associated physical channels, and send an indication of the UL channels to the UEs. UL channels may be, for example, a random-access channel (RACH) or sounding response signal (SRS). Once data is transmitted through the UL channels to APs 340, AP 340 may forward the data to the AC via an uplink message 320.

In certain embodiments, the AC may periodically send requests to initiate an uplink transmission, such as SRS, through downlink multicast packets. APs 340 receiving the multicast packets can then request information from the UEs, and report the data back to the AC. Once the data is received by the AC, the AC can analyze the response and update DL and/or UL user equipment channel conditions.

In other embodiments, APs 340 may also receive a message including an indication of at least one UL physical channel, such as physical uplink control channel (PUCCH) and/or physical uplink shared channel (PUSCH). The message may be transmitted from the CC or the AC to APs 340 in multicast packets. The multicast packets may include a bitmap indication of the serving APs 340. Upon receiving the message, the APs will decode the associated physical channel in accordance with the received bitmap.

While downlink transmissions, such as downlink message 310, from the AC to the at least one AP 340 may include a multicast transmission, uplink transmissions, such as uplink message 320, from the at least one AP 340 to the AC may be unicast. For example, a PHY API response message from the at least one AP 340 to the CC or the AC can be transmitted as a unicast message 350 having data packets. These data packets in the unicast message can carry decoded results from UL channels received by APs 340 from the UEs.

Figure 4:
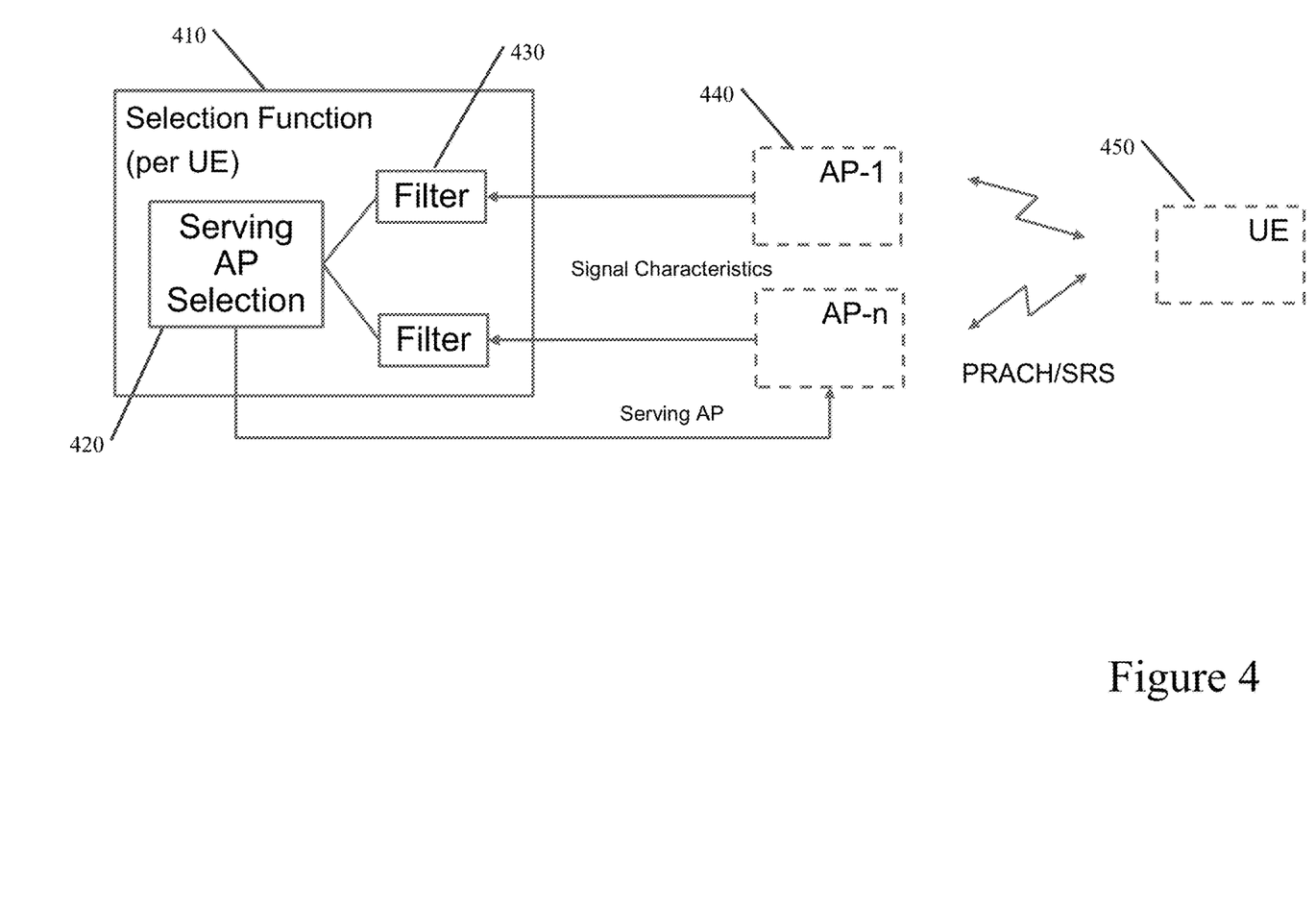
FIG. 4 illustrates a system according to certain embodiments.

FIG. 4 illustrates a system according to certain embodiments. Specifically, FIG. 4 illustrates an AC 410 including a selection function that may independently determine which AP 440 will serve each UE 450. After the at least one DL channel and the at least one UL channel are established, at least one AP 440 can receive a signal characteristic through SRS and/or PRACH. This signal characteristic may then be transmitted through a data switch, such as an Ethernet switch, to AC 410. Signal characteristics may include a measurement of key signal characteristics, such as signal-to-interference-plus-noise ratio (SINR), associated with PRACH and/or SRS transmissions by the UE.

In certain embodiments, AC 410 may include a selection function. The selection function may help AC 410 select a user equipment 450 to be served by the at least one AP based on the signal characteristic. The selection function may include a serving AP selection 420 function. Once the serving AP is selected, AC 410 may send an assignment to the AP indicating which AP will serve a given UE. In some embodiments, an initial serving AP is chosen based on RACH received by AC 410 having an estimated signal characteristic, for example, SINR. Serving AP selection 420 function may then be updated based on future received SRS.

A filter 430 located within AC 410 may maintain a filtered signal characteristic value, such as SINR. The filtered signal characteristic value may be maintained for each AP 440, UE 450 pairing within the SFN area. The determination of which AP serves which UE may be changed based on a configurable threshold. Parameters used to define the threshold may be either adjustable or fixed. For example, the threshold may be set as a multiple of the current decibel level by which the QoS provided to the UE can be improved. In certain embodiments, a UL power control may be performed in the AC based on SINR and/or a received signal strength indicator (RSSI) measurements from the serving AP.

Figure 5:
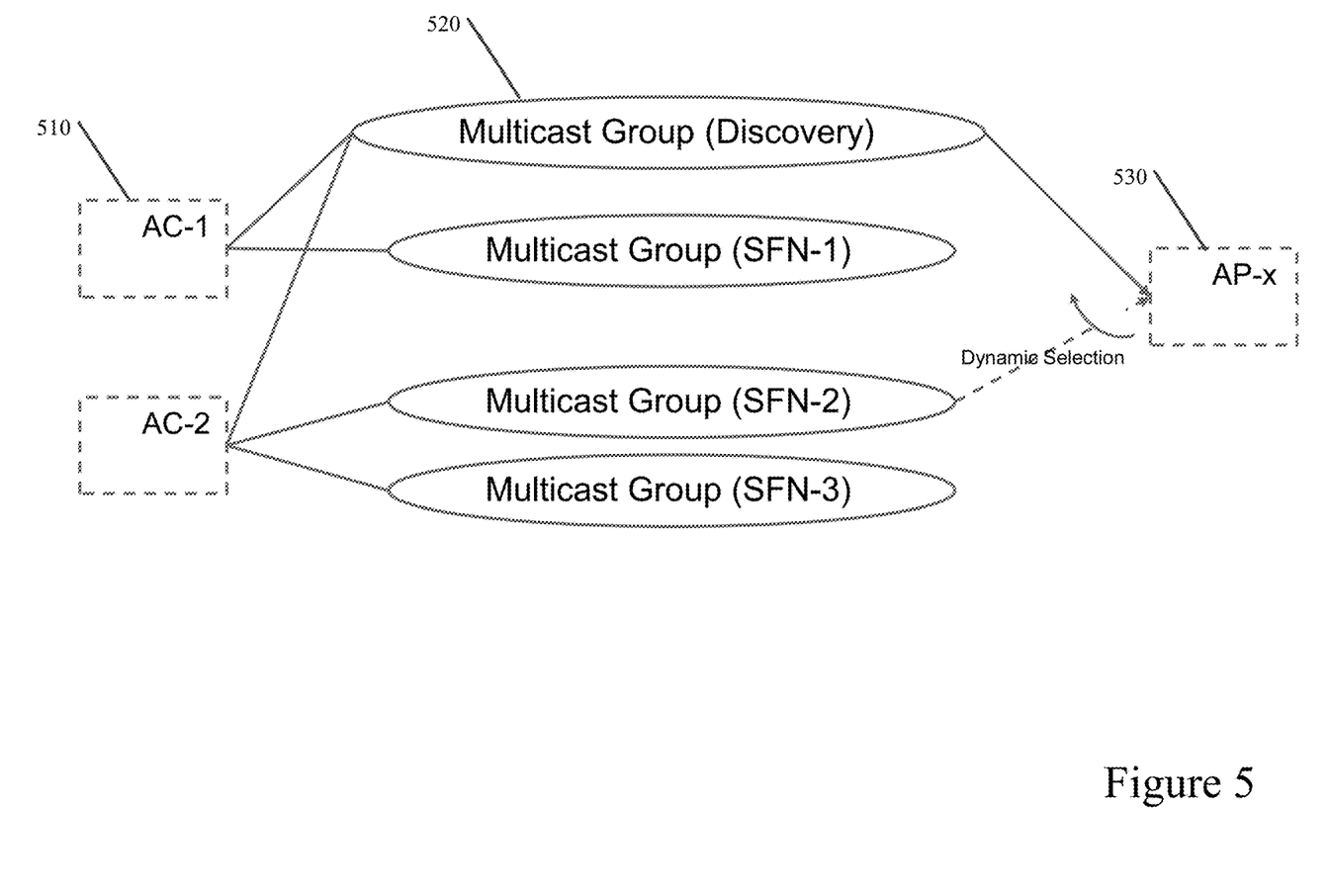
FIG. 5 illustrates a system according to certain embodiments.

FIG. 5 illustrates a system according to certain embodiments. Specifically, FIG. 5 illustrates certain embodiments that reduce efforts associated with AP installation by using an advertisement including SFN area information. The advertisement may be sent by a discovery multicast group. Information included within the advertisement can help facilitate an association between a human oriented SFN area identification and a configuration URL. In certain embodiments, a human oriented SFN indication means that a user may have to manually add, upload, and/or program an indication of an SFN area into an access point. In other words, the SFN may be predetermined by a user, and added to the at least one access point. In certain embodiments, an advertisement may be advertised by a network entity, and the AP may receive the advertisement by tuning into a known advertising address.

In some embodiments, AC-1 and AC-2 510 can each be connected to a multicast group 520. There may be two different types of multicast groups, one group type associated with discovery and another group type associated with a specific SFN area. While both AC-1 and AC-2 can be connected to the multicast discovery group, each AC may be connected to a number of other multicast SFN groups that are dynamically selected based on an area in which the AP is located and the configuration URL. As can be seen in FIG. 5, AC-1 is connected to SFN-1, and AC-2 is connected to SFN-2 and SFN-3.

During installation of AP 530, one installing an AP may add, upload, or program the human oriented SFN area identification into the AP. The advertisement information may then be used in conjunction with the added or uploaded SFN area identification to determine a configuration URL. The AP can automatically perform all or part of the configuration of the AP. In certain embodiments, the AP may join the discovery multicast group and listen for an advertisement. For example, the SFN identification, may be information identifying that the AP is located on the third floor of a building. A user or an installer of the AP may program the human oriented identification into the AP.

The AP may then utilize the advertisement information to derive a configuration URL. The configuration URL can be used to download LTE cell configuration parameters and a multicast group address. The AP can then apply the configuration parameters and begin operations. In other words, once the SFN area identification is added or uploaded into the AP, the AP may use the advertised information to derive LTE cell configuration parameters, and multicast group addresses. The AP may be said to dynamically select a multicast group. The AP may then automatically begin operations based on the derived information.

In certain embodiments, the AP may receive an advertisement comprising area information for at least one SFN. The AP may then use the advertisement and preconfigured area identification stored in the AP to determine a URL. The preconfigured area identification may be set by a user or an installer of the AP. The AP may then use the uniform resource locator to dynamically select a multicast group to join.

Figure 6:
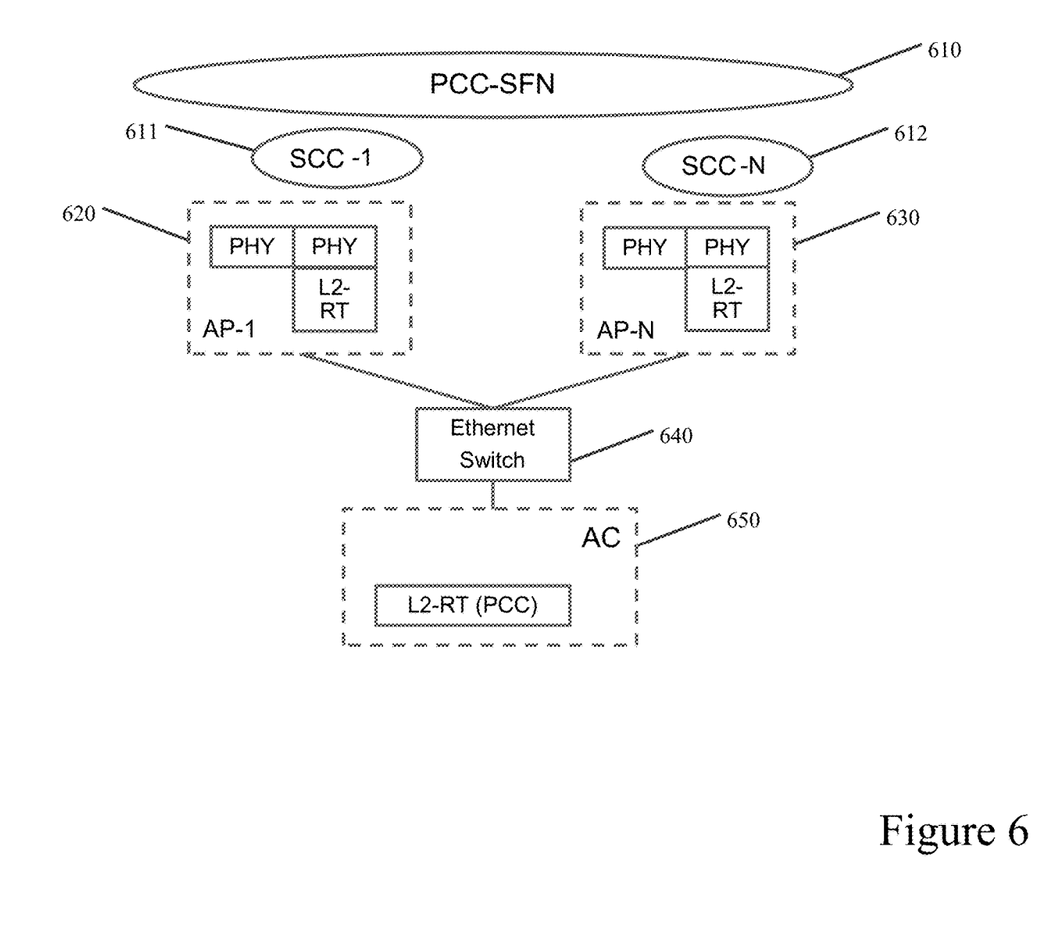
FIG. 6 illustrates a system according to certain embodiments.

FIG. 6 illustrates a system according to certain embodiments. In particular, FIG. 6 illustrates deployment of additional layers which support a primary component carrier (SFN-PCC) 610, and secondary non-SFN component carrier (SCC-1, SCC-n) 611, 612, where n is the total number of secondary component carriers. SCC-1, SCC-n, 611, 612 may be localized in an AP unit and/or in an RRU in certain embodiments. In addition, in some embodiments, AP units 620, 630 may include both physical layer functions and data link layer or layer 2 functions, such as MAC. In some embodiments AP units 620, 630 may also include additional physical layer functioning. APs 620, 630 may communicate with AC 650 through a data switch, for example an Ethernet switch 640.

Certain embodiments may allow for data sharing between common data link or layer 2 functions that support the primary PCC, and those layer 2 functions, such as distributed MAC, that support the SCCs. AC 650 may include layer 2 functions that utilize well known approaches, such as handover, load balancing, carrier aggregation, and/or multi-connectivity to distribute UE sessions between the primary and secondary component carriers.

In certain embodiments, the common control, such as CC 210 illustrated in FIG. 2, may detect that the UE is within the serving area of a particular SCC-1, SCC-n, 611, 612 and activate the SCC-1, SCC-n, 611, 612. The detection may be due to a reporting of a radio resource control (RRC) handoff event. AC 650, having layer 2 functions, may then forward a portion or all of a DL RRC packet data unit towards the AP serving the SCC-1, SCC-n. Various windowing techniques can be used to control the amount of packets sent to the APs. The layer 2 function in the AP may then concatenate the packet data units to fit within the layer 1 or physical layer transport block allocations. The transport block allocations may be made by a distributed local MAC scheduling function in APs 620, 630.

The layer 2 functions in AP 620, 630 may periodically receive DL channel state information (CSI) from both primary PCC 610 and SCC-1, SCC-n 611, 612. CSI report related to the SCC-1, SCC-n may be forwarded to the distributed MAC element in APs 620, 630. In certain embodiments, the layer 2 functions in the AC 650 may perform RLC acknowledgement and retransmit functions for DL and/or UL packets sent on either the primary or secondary control carriers. The distributed MAC, in APs 620, 630 may in some embodiments independently schedule DL transmissions to SCC-1, SCC-n 611, 612 based on CSI received from AC 650, or from local UL transmissions from SCC-1, SCC-n 611, 612.

In certain embodiments, there is no UL associated with the SPC-1, SCC-n, and the distributed MAC may send notifications to the AC 650 so that it may properly receive HARQ ACK indications on the PCC. Upon reception of the ACK/NAK information transmitted on an uplink channel, the AC 650 may forward such indications to AP 620, 630 through Ethernet switch 640. Distributed MAC can then perform normal HARQ processing via ACK indications locally received on the SCC-1, SCC-n, or by using an indication forwarded from AC 650.

In embodiments where SCC-1, SCC-n support UL operations, the distributed MAC may independently schedule UL UE transmissions, and forward the received packets to a centralized RLC/PDCP UL HARQ operation, handled locally by the distributed MAC in APs 620, 630.

Figure 7:
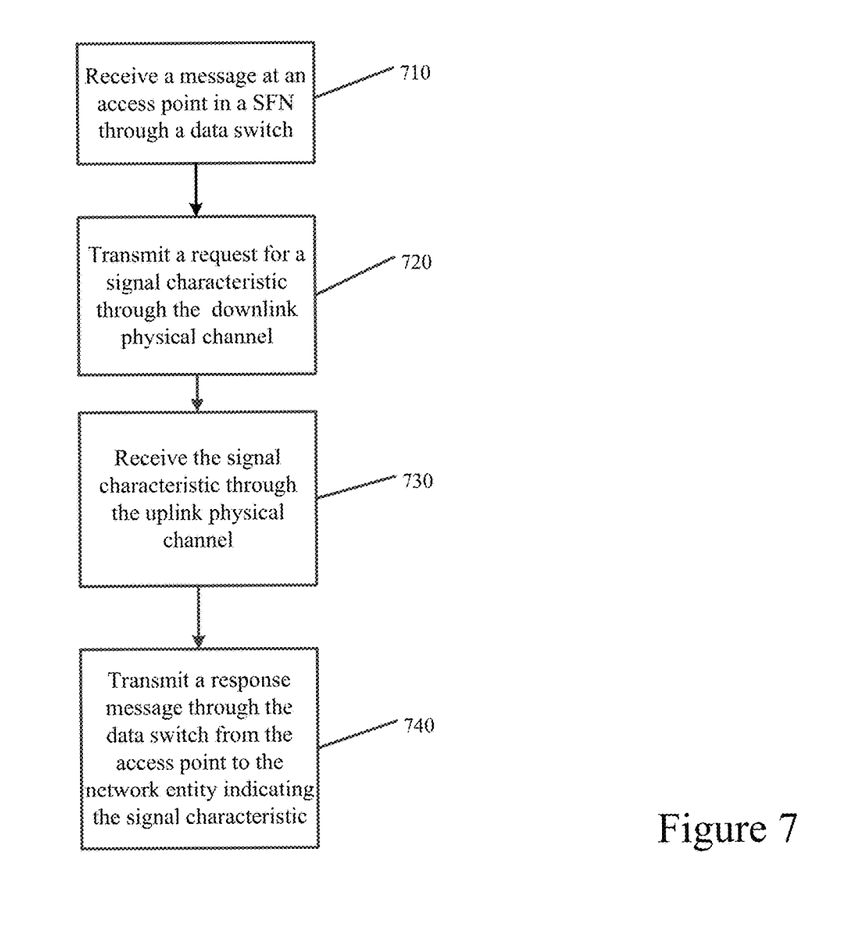
FIG. 7 illustrates a flow diagram according to certain embodiments.

FIG. 7 illustrates a flow diagram according to certain embodiments. In particular, step 710 receives a message at an access point in a SFN through a data switch. The message may be a multicast message, and may include an indication of at least one of a downlink physical channel or an uplink physical channel some embodiment may include one or more downlink physical channels or one or more uplink physical channels. In step 720, a request may be transmitted from the access point to a user equipment. The request may include a request for a signal characteristic through the DL physical channel. In response, in step 730, a signal characteristic may be received at the access point through the UL channel. The signal characteristic may be, for example, an SINR. In step 740, a response message is transmitted through the data switch, such as an Ethernet switch, from the access point to the network entity indicating the signal characteristic. The response message may be a unicast message. The network entity may include CC 210 or AC 220, shown in FIG. 2.

Figure 8:
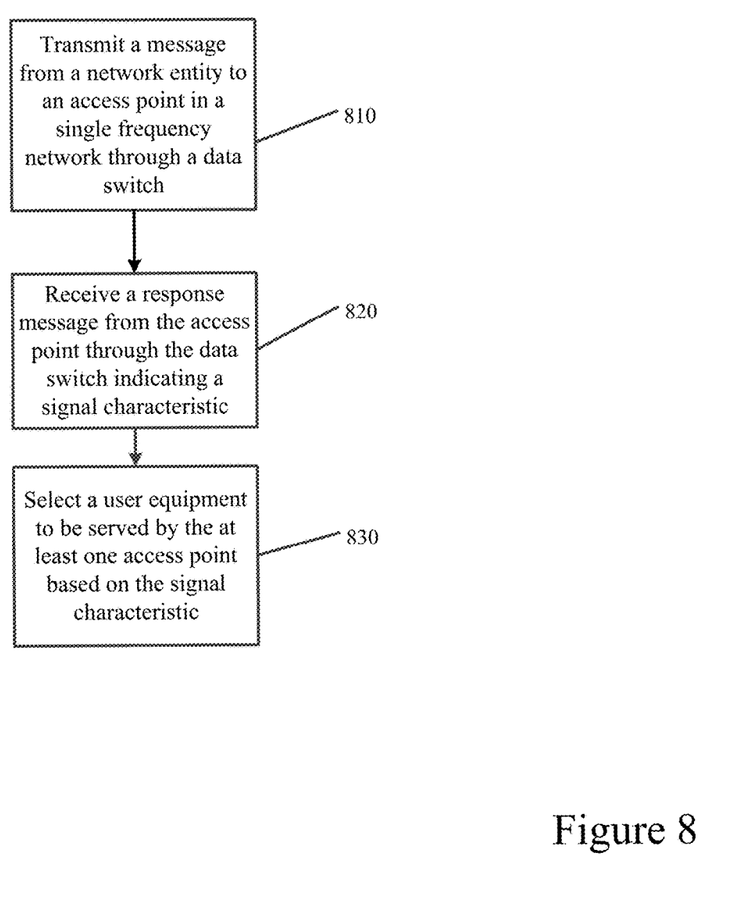
FIG. 8 illustrates a flow diagram according to certain embodiments.

FIG. 8 illustrates a flow diagram according to certain embodiments. In step 810, the network entity, such as a CC or AC, may transmit a message to an access point in a SFN through a data switch. The data switch may be a general purpose data switch or a data switch used for multicast broadcasting. The network entity may then receive a response message from the access point through the data switch indicating a signal characteristic, as shown in step 820. In step 830, the network entity may select a user equipment to be served by the at least one access point based on the signal characteristic. The selection may be sent to the access point in the form of an assignment.

Figure 9:
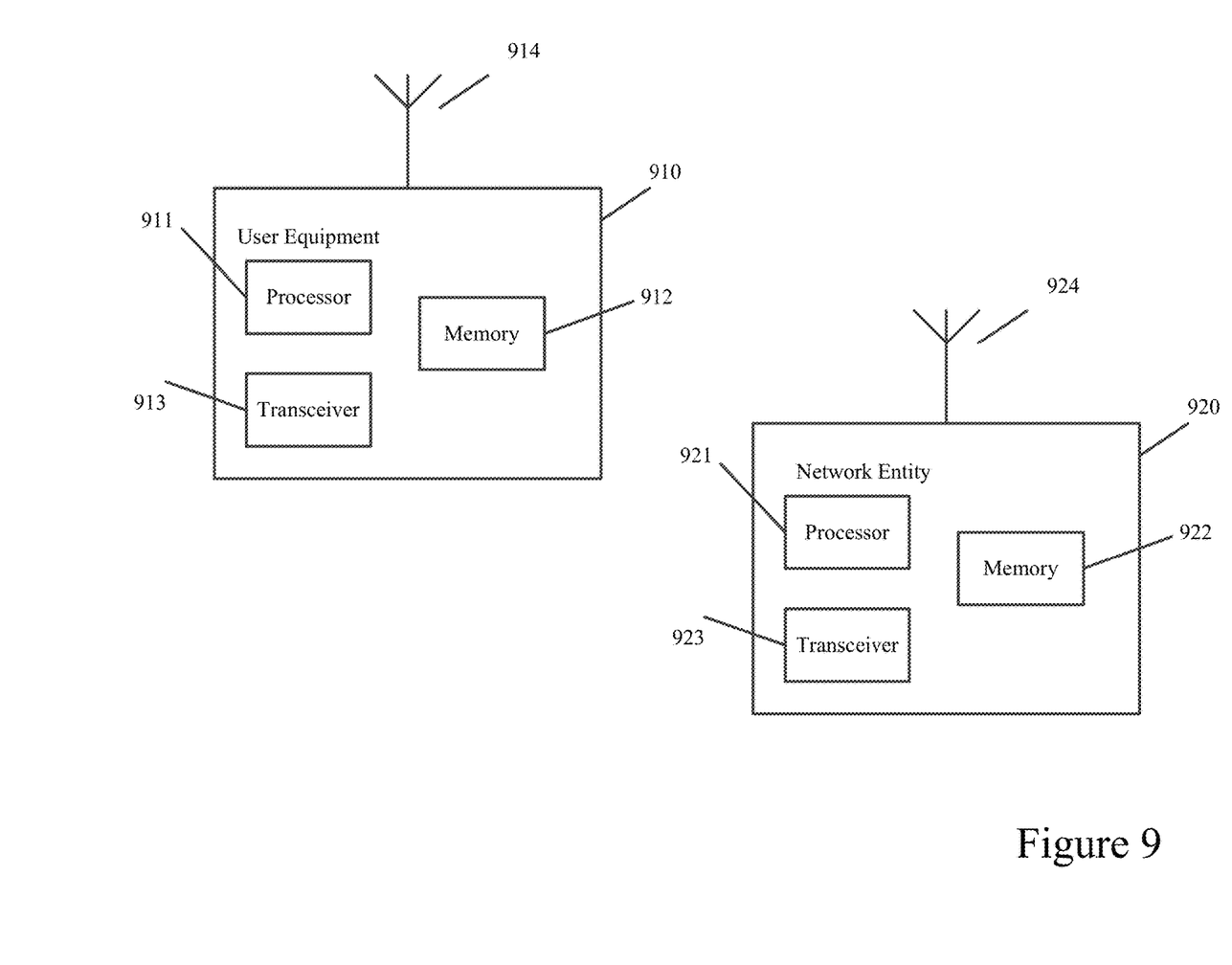
FIG. 9 illustrates a system according to certain embodiments.

FIG. 9 illustrates a system according to certain embodiments. It should be understood that each function or signal in FIGS. 2, 3, 4, 5, 6, 7, and 8 may be implemented by various means or their combinations, such as hardware, software, firmware, one or more processors and/or circuitry. In one embodiment, a system may include several devices, such as, for example, network entity 920 or UE 910. The system may include more than one UE 910 and more one network entity 920, although only one access node shown for the purposes of illustration. A network entity may be a baseband unit, a main distribution unit, a remote distribution unit, a radio head, as shown in FIG. 1, a remote radio unit, a common control, an area control, an access point, or a combination thereof, as shown in FIG. 2, an access node, a base station, a SGNB, an eNB, server, host, or any of the other access or network node discussed herein.

Each of these devices may include at least one processor or control unit or module, respectively indicated as 911 and 921. At least one memory may be provided in each device, and indicated as 912 and 922, respectively. The memory may include computer program instructions or computer code contained therein. One or more transceiver 913 and 923 may be provided, and each device may also include an antenna, respectively illustrated as 914 and 924. Although only one antenna each is shown, many antennas and multiple antenna elements may be provided to each of the devices. Other configurations of these devices, for example, may be provided. For example, network entity 920 and UE 910 may be additionally configured for wired communication, in addition to wireless communication, and in such a case antennas 914 and 924 may illustrate any form of communication hardware, without being limited to merely an antenna.

Transceivers 913 and 923 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 910 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 2, 3, 4, 5, 6, 7, and 8. In certain embodiments, at least one memory including computer program code can be configured to, with the at least one processor, cause the apparatus at least to perform any of the processes described herein.

Processors 911 and 921 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 920 or UE 910, to perform any of the processes described above (see, for example, FIGS. 2, 3, 4, 5, 6, 7, and 8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 9 illustrates a system including a network entity 920 and UE 910, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 910 may likewise be provided with a variety of configurations for communication other than communication network entity 920.

Certain embodiments described above may provide for a flexible and cost effective architecture for SFN deployment in 3GPP technology, such as 4G and 5G systems. As shown in FIG. 5, certain embodiments allow for a dynamic configuration of a SFN and a dynamic adaptation of user traffic patterns. Some embodiments may make it easier to split the SFN into two or more SFNs to increase capacity, by simply adding or re-arranging multicast groups and installing additional AC elements. AP units can also be added to increase coverage, and the AP units can be made to subscribe to the existing multicast group. In addition, a single time source can support multiple AP and AC functions which can help minimize the number of GPS/GNSS units to be installed. Certain embodiments may also support multi-UE spatial multiplexing and uplink cooperative multi-point (CoMP) features.

Some embodiments allow for high scalability. By distributing physical layer and data link functions, such as MAC functioning, between AC and AP elements, the number of elements in the system are increased. This can avoid the BBU acting as a processing bottleneck that limits the scalability of competing solutions based on a traditional macro-cell BBU. In addition, embodiments that include an Ethernet switch may also have high scalability. Ethernet multicast technology is highly scalable and can support a large number of RRU per SFN area.

Using an Ethernet infrastructure can also lower the cost of the system. Complexity is shifted out of the AP to allow for use of a commodity residential or enterprise femto-cell platform in high density applications. Distributing the physical layer and data link layer functions can lower the bandwidth requirement in the front haul, and avoid the high cost fiber front haul transport and switching. The cost of SFN can scale linearly as the number of remote units increase.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

AP Access Point
AC Area Control
BBU Baseband Unit
CC Common Controller
SFN Single Frequency Network
CPRI Common Public Radio Interface
OBSAI Open Base Station Architecture Initiative
MBMS Multimedia Broadcast Multicast Service
FAPI Femto Application Platform Interface
FZAP FlexiZone Access Point
FSM Flexi System Module
MDU Main Distribution Unit
RDU Remote Distribution Unit
RH Radio Head
RRU Remote Radio Unit
UE User Equipment

We claim:
1. An apparatus, comprising:
at least one memory comprising computer program code; and
at least one processor;
wherein the at least one memory and the computer program code are configured, with the at least one processor, to cause the apparatus at least to:
receive a message at an access point in a single frequency network from a network entity through a data switch, wherein the message comprises an indication of at least one of a downlink physical channel or an uplink physical channel;
perform physical layer functions at the at least one access point, while data link layer functions are performed by the network entity;
transmit a request for a signal characteristic through the downlink physical channel to a user equipment;
receive the signal characteristic through the uplink physical channel from the user equipment; and transmit a response message through the data switch from the access point to the network entity indicating the signal characteristic.

2. The apparatus according to claim 1, wherein the message received from the network entity is a multicast message.

3. The apparatus according to claim 1, wherein the data switch is used for multicast broadcasting of the message.

4. The apparatus according to claim 1, wherein the data switch comprises a general purpose data switch.

5. The apparatus according to claim 1, wherein the response message transmitted from the access point to the network entity is a unicast message.

6. The apparatus according to claim 1, wherein the at least one memory and the computer program code are configured, with the at least one processor, to cause the apparatus at least to:
perform physical layer functions and data link functions at the at least one access point.

7. The apparatus according to claim 1, wherein the data switch comprises an Ethernet switch.

8. The apparatus according to claim 1, wherein synchronization in the single frequency network comprises a local synchronization source or a network synchronization source.

9. The apparatus according to claim 1, wherein the at least one memory and the computer program code are configured, with the at least one processor, to cause the apparatus at least to:
receive an advertisement associated with an area of the single frequency network; and
join a multicast group based on the received advertisement.

10. The apparatus according to claim 9, wherein the area of the single frequency network may be predetermined and added to the at least one access point.

11. The apparatus according to claim 9, wherein the at least one memory and the computer program code are configured, with the at least one processor, to cause the apparatus at least to:
dynamically select the multicast group at the at least one access point based on the advertisement.

12. The apparatus according to claim 1, wherein the at least one memory and the computer program code are configured, with the at least one processor, to cause the apparatus at least to:
receive from the network entity an assignment for which user equipment the at least one access point will serve.

13. The apparatus according to claim 12, wherein the at least one memory and the computer program code are configured, with the at least one processor, to cause the apparatus at least to:
send the assignment to a non-single frequency network secondary component carrier.

14. The apparatus according to claim 1, wherein the at least one uplink channel is at least one of a random-access channel, a sounding response signal channel, a physical uplink control channel, or a physical uplink shared channel.

15. The apparatus according to claim 1, wherein the at least one downlink channel is at least one of a physical control format indicator channel, a physical multicast channel, a physical hybrid automatic repeat request indicator channel, a physical downlink control channel, or a physical downlink shared channel.

16. An apparatus, comprising:
at least one memory comprising computer program code; and
at least one processor;
wherein the at least one memory and the computer program code are configured, with the at least one processor, to cause the apparatus at least to:
transmit a message from a network entity to an access point in a single frequency network through a data switch, wherein the message comprises an indication of at least one of a downlink physical channel or an uplink physical channel;
perform physical layer functions at the at least one access point, while data link layer functions are performed by the network entity;
receive a response message from the access point through the data switch indicating a signal characteristic; and
select a user equipment to be served by the at least one access point based on the signal characteristic.

17. The apparatus according to claim 16, wherein the message transmitted from the network entity to the access point is a multicast message.

18. The apparatus according to claim 16, wherein the network entity comprises a selection function that helps in selection of the user equipment to be served by the at least one access point.

19. The apparatus according to claim 16, wherein the at least one memory and the computer program code are configured, with the at least one processor, to cause the apparatus at least to:
perform physical layer functions and data link functions at the at least one access point.

20. The apparatus according to claim 16, wherein another network entity is connected to the network entity, wherein the another network entity helps the network entity perform the data link layer functions.

21. A method comprises:
receiving a message at an access point in a single frequency network from a network entity through a data switch, wherein the message comprises an indication of at least of a downlink physical channel- or an uplink physical channel;
performing physical layer functions at the at least one access point, while data link layer functions are performed by the network entity;
transmitting a request for a signal characteristic through the downlink physical channel to a user equipment;
receiving the signal characteristic through the uplink physical channel from the user equipment; and
transmitting a response message through the data switch from the access point to the network entity indicating the signal characteristic.

22. A method comprising:
receiving at an access point an advertisement comprising area information for at least one single frequency network;
determining a uniform resource locator based on the advertisement and a preconfigured area identification stored in the access point;
dynamically selecting a multicast group to join using the uniform resource locator;
receiving a message at the access point in a single frequency network from a network entity through a data switch as part of the selected multicast group; and
performing physical layer functions at the at least one access point, while data link layer functions are performed by the network entity.

23. The method according to claim 22, wherein the preconfigured area identification is set by a user or installer of the access point.

* * * * *